United States Patent

Clayton

[15] 3,690,115
[45] Sept. 12, 1972

[54] CONTROLLING PRESSURE IN FLUID TRANSFER CONDUITS

[72] Inventor: Hadwen A. Clayton, Bartlesville, Okla.

[73] Assignee: Phillips Petroleum Company

[22] Filed: Nov. 2, 1970

[21] Appl. No.: 86,155

[52] U.S. Cl. .................. 62/49, 62/55, 137/14, 137/486, 137/487.5
[51] Int. Cl. ............................................. F17c 13/02
[58] Field of Search .....62/49; 137/14, 2, 486, 487.5; 73/198, 230 B; 196/132; 203/2

[56] References Cited

UNITED STATES PATENTS

| 2,895,502 | 7/1959 | Roper et al. | 137/486 |
| 2,938,536 | 5/1960 | Ehrenberg | 137/486 |
| 3,018,229 | 1/1962 | Morgan | 196/132 X |
| 3,158,556 | 11/1964 | Hopper | 196/132 X |
| 3,407,658 | 10/1968 | Kerbow et al. | 73/205 D |
| 3,470,069 | 9/1969 | Bracken et al. | 132/2 X |
| 3,541,803 | 11/1970 | Young | 62/49 X |

Primary Examiner—Meyer Perlin
Assistant Examiner—R. Capossela
Attorney—Young and Quigg

[57] ABSTRACT

The pressure at a downstream point in a conduit through which a fluid is flowing is controlled so as to maintain the pressure at an upstream point in the conduit substantially constant. Said control is effected by measuring the pressure and flow rate at said downstream point, and adjusting said pressure in accordance with the measured pressure and measured flow rate.

11 Claims, 3 Drawing Figures

CONTROLLING PRESSURE IN FLUID TRANSFER CONDUITS

This invention relates to controlling pressure in fluid transfer conduits.

In the transfer of fluid through conduits, the pressure loss or drop which occurs between the intake at one end of the conduit and the outlet at the other end of the conduit is frequently troublesome. This is particularly true when the transfer pump, blower, etc., is located in the conduit a significant distance from said intake. In such instances, there is danger of the pressure loss or drop between the pump or blower suction and the intake end of the conduit being great enough to create an undesirably low pressure at said intake end.

For example, during the loading of ships with liquefied natural gas (LNG), a considerable amount of vapor is flashed or generated. This is particularly so during the initial stages of loading when the ship comes in with "hot" tanks, e.g., at a temperature appreciably above about −260° F., the normal operating temperature of the ship's tanks when filled with LNG. In such ships the tanks are heavily insulated so as to maintain the temperature at approximately −260° F., at substantially atmospheric pressure, by means of autorefrigeration. The ship's tanks are not designed to withstand pressures much greater than atmospheric. Consequently, vapors generated during the loading operation must be vented. Safety requirements usually prohibit simple venting of the vapors to the atmosphere in the region of the ship. Therefore, it is frequently necessary to employ positive means, such as a blower, for withdrawing vapors from the ship's tanks and transporting same ashore via a conduit having a relatively great length, for venting at a remote location or other disposition. The inner walls of the ship's tanks are covered with a thin membrane of Invar metal. A vacuum condition in said tanks will cause said membrane to be pulled from its supports and collapse or otherwise be damaged. Consequently, care must be taken in withdrawing the vapors from the ship's tanks so as to avoid creating a vacuum condition therein.

The present invention provides a solution for the above-described problems. The present invention provides a method and apparatus for compensating for the pressure drop which occurs in the vapor transfer conduit between the ship's tanks and the blower suction so that the pressure in the ship's tanks remains substantially constant at the desired value of substantially atmospheric pressure, even though the blower suction pressure may be less than atmospheric, i.e., a vacuum.

Thus, according to the invention, there is provided a method for controlling the pressure of a fluid at a downstream point in a conduit through which said fluid is flowing, so as to maintain the pressure at a spaced apart upstream point in said conduit substantially constant, which method comprises, the steps of: (a) measuring said pressure in said conduit at said downstream point; (b) measuring the effective flow rate of said fluid flowing in said conduit past said downstream point; and (c) adjusting said pressure at said downstream point in accordance with said measured pressure and said measured flow rate.

Further, according to the invention, there is provided apparatus for controlling the pressure of a fluid at a downstream point in a conduit through which said fluid is flowing so as to maintain the pressure at a spaced apart upstream point in said conduit substantially constant, which comprises, in combination: first means for measuring the pressure at said downstream point; second means for measuring the effective flow rate of said fluid flowing in said conduit past said downstream point; and third means for adjusting the pressure at said downstream point in accordance with said measured pressure and said measured flow rate.

FIG. 3 is a graphic representation illustrating the operation of the invention whereby the pressure drop in the vapor discharge conduit is compensated for.

Figure 1:
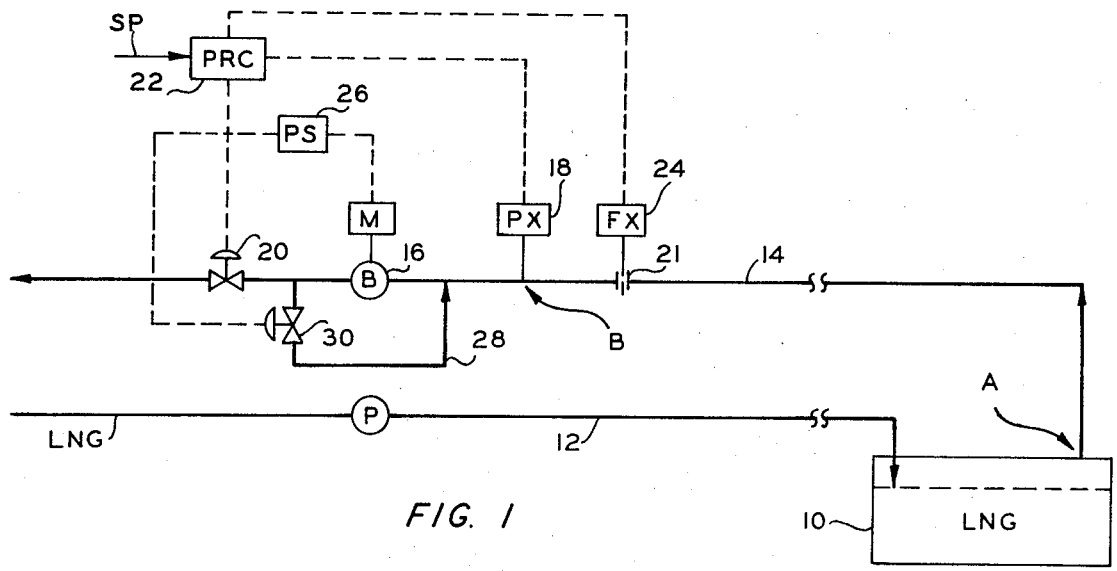
FIG. 1 is a schematic representation of one presently preferred combination of apparatus which can be employed in practicing the method of the invention.

Referring now to the drawings, wherein like reference numerals are employed to denote like elements, the invention will be more fully explained. In FIG. 1, there is illustrated a ship 10 for receiving a cargo of liquefied natural gas (LNG) from loading conduit 12. Said ship 10 is a conventional ship designed for carrying a cargo of LNG at substantially atmospheric pressure. During the loading, vapors are withdrawn from the ship's tanks via vapor conduit 14 having blower 16 disposed therein. A conventional pressure transmitter 18, operatively connected into conduit 14 at downstream point B, is provided for measuring the pressure at said downstream point B which is adjacent the suction of blower 16. At no flow, or low flow, conditions the pressure at downstream point B will be the same or essentially the same as that in the ship's tanks, i.e., upstream point A in the ship's tank or the header conduit immediately adjacent thereto. Motor valve 20, disposed in conduit 14 downstream from blower 16, is a normally open valve. In operation, said pressure transmitter 18 establishes a first signal which is transmitted to said pressure controller 22. As the amount of flashed or generated vapors in the ship's tanks increases, the pressure in conduit 14 increases, pressure controller 22 opens valve 20 to a greater extent, and flow through conduit 14 increases. However, a pressure controller alone cannot protect the ship's tanks from a vacuum condition and still permit blower 16 to move the volume of vapor which must be moved. This is due to the fact that a flow is increased in conduit 14 by opening valve 20, blower 16 can decrease the pressure in conduit 14 at downstream point B to the extent that a vacuum will be created in the ship's tanks.

Thus, the vapor flow rate through conduit 14 must be taken into consideration. In accordance with the invention, flowmeter 21 and flow transmitter 24 are provided to sense said vapor flow and establish a second signal representative thereof, which second signal is transmitted to pressure controller 22. In a presently preferred embodiment of the invention, said pressure controller 22 is an instrument capable of correlating said first signal from pressure transmitter 18 and said second signal from flow transmitter 24, and establishing a third signal which is proportional to the pressure loss or drop in conduit 14 by pneumatically biasing the setpoint of pressure controller 22 to a lesser value. Said third signal is transmitted to valve 20 and said valve partially closes responsive thereto. The partial closing of said valve 20 increases the pressure at downstream point B to a value which is sufficient to prevent the pressure drop in conduit 14 from causing a vacuum to be created at upstream point A, e.g., in the ship's tanks. In other words, the combination of pressure transmitter 18, flow transmitter 24, and pressure controller 22 will maintain the pressure in conduit 14 at downstream point B at a value such that no vacuum is caused at upstream point A, even though the pressure at point B may be less than atmospheric. Upon a decrease in flow rate during the loading, the setpoint of pressure controller 22 is biased to a greater value than the previous value, and the above operations are reversed. It has been found that the method of the invention makes it possible to maintain the pressure in the ship's tanks substantially constant.

Figure 2:
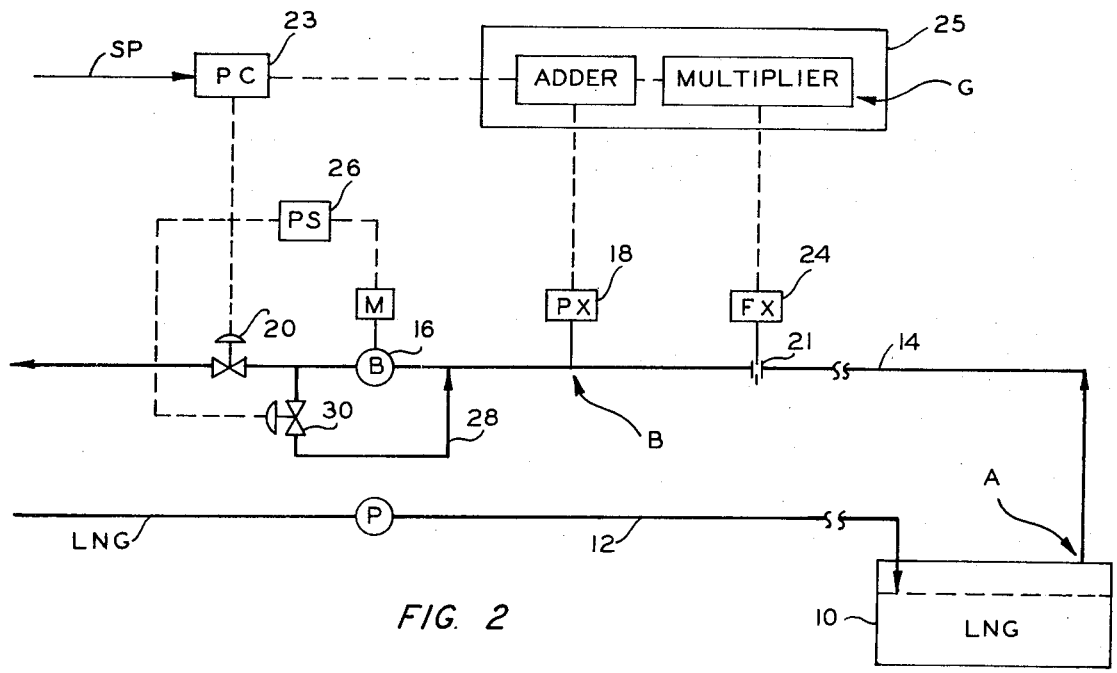
FIG. 2 is a schematic representation of another combination of apparatus which can be employed in practicing the method of the invention.

One type of preferred instrument which can be employed for said pressure controller 22 is a Taylor FULSCOPE Pneumatic Set Controller, Model A–127R, which has been previously calibrated for the system. However, other control instruments, including electrical instruments, can be employed in the practice of the invention to combine said first and said second signals and establish said third signal. This is illustrated in FIG. 2. For example, said first signal from pressure transmitter 18 can be transmitted to a scaling relay 25 comprising an adder and multiplier as indicated. Said second signal from flow transmitter 24 is also transmitted to said scaling relay 25 wherein it is multiplied by a constant or multiplier G, which is representative of the pressure drop constant for conduit 14, and establishes a fourth signal which is transmitted to the adder shown. Said adder sums said first and fourth signals to establish a fifth signal. Said relay 25 thus correlates said first and second signals and establishes an output or fifth signal which is representative of the pressure at point B corrected by the pressure drop or loss in conduit 14. Said fifth signal is transmitted to pressure controller 23 and establishes said third signal by comparing said fifth signal with the setpoint of pressure controller 23. Said third signal is then transmitted to valve 20 which operates responsive thereto as described above. Any suitable type of computing relay can be employed as scaling relay 25. One suitable instrument is a Taylor TRANSCOPE Pneumatic Relay, Model 105N. Pressure controller 23 can be any suitable conventional instrument.

Other elements of the combinations of apparatus illustrated in FIGS. 1 and 2 include pressure switch 26 and bypass conduit 28 having motor valve 30 disposed therein. Said pressure switch 26 is employed to start and stop the motor of blower 16 at the control limits of the pressure controllers 22 and 23. For example, said pressure switch starts the blower motor when the pressure controller has valve 20 in wide open position at one control limit, and stops the blower motor when the valve 20 is in a partially closed position at the other control limit of the pressure controller. Said valve 30 is a normally closed valve which is also actuated by said third signal. Thus, said valve 30 opens as said valve 20 closes, and bypass 28 serves to maintain a substantially constant load on blower 16.

Figure 3:
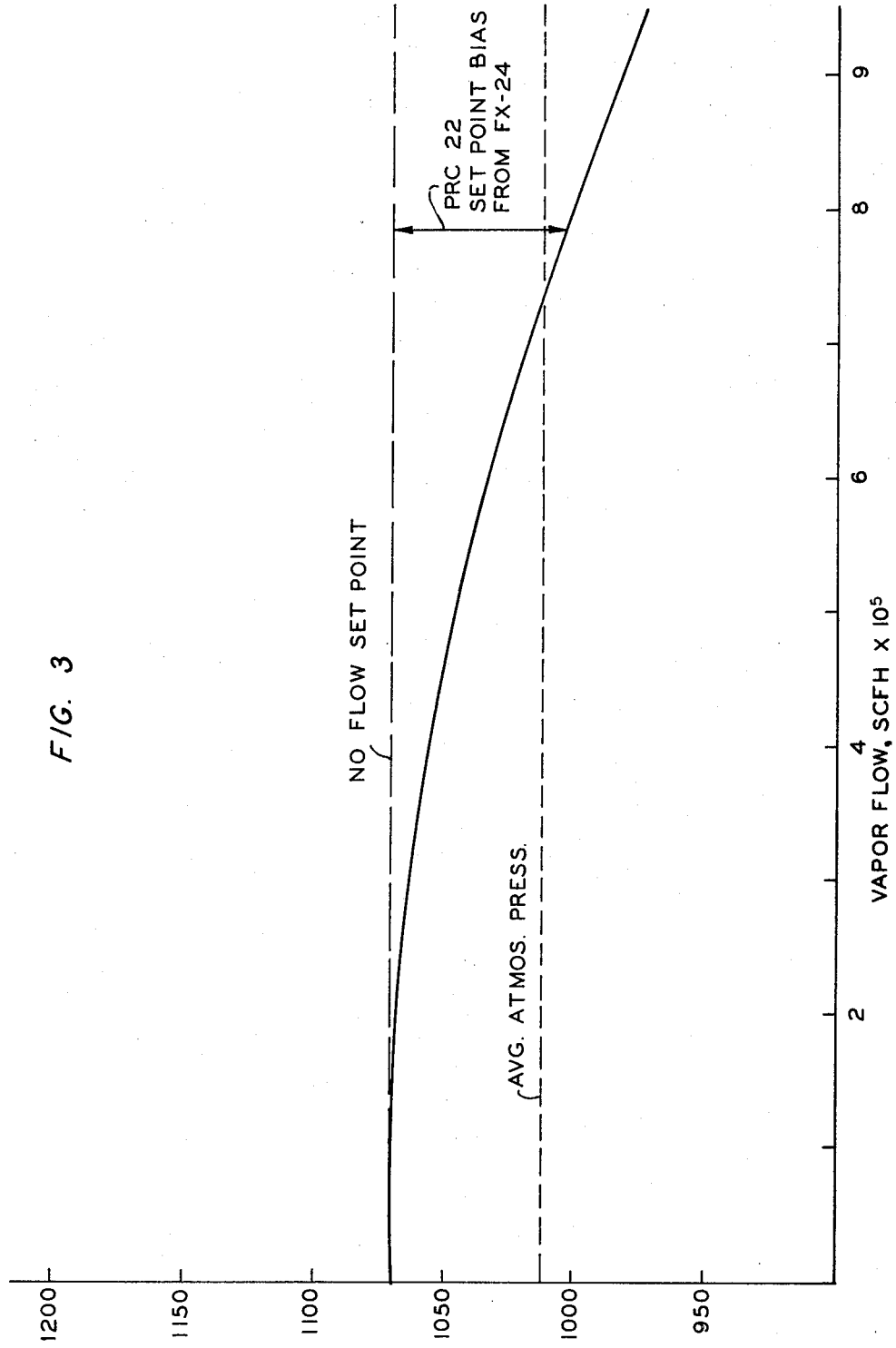

FIG. 3 illustrates graphically the pressure drop through a nominal 12-inch diameter vapor conduit which has been employed as conduit 14 in the practice of the invention, essentially as illustrated in FIG. 1. Said conduit had a length of approximately 200 feet between upstream point A at the tank inlet header on the ship and downstream point B located 7 feet from the suction of blower 16. Flow transmitter 24 was located slightly upstream from point B. Referring to FIG. 3, with the ship tank pressure (upstream point A) set at 1,070 millibars, with increasing flow the pressure drop will follow the curve shown. For example, when loading with a vapor flow through conduit 14 greater than about $7.4 \times 10^5$ standard cubic feet per hour, the pressure at downstream point B will be less than atmospheric. However, with the first signal from pressure transmitter 18 and the second signal from flow transmitter 24 combined in flow controller 22, and the setpoint of said flow controller biased in accordance with the flow, there is established a third signal which is transmitted to valve 20. Said valve 20, being responsive to said third signal will then maintain the pressure at upstream point A substantially constant even though the pressure varies at downstream point B.

The method of the invention is also capable of being carried out manually. For example, an operator can observe the pressure by means of a pressure gauge at point B, observe the flow at meter 21, and adjust valve 20 manually to maintain the desired pressure at point A.

While the invention has been described with particular reference to removing vapors generated during the loading of a ship's tanks with LNG, the invention is not limited thereto. The invention can be employed in removing vapors from any type of tank which is being filled with any vaporizable liquid which generates vapors which must be removed from the tank without unduly lowering the pressure in the tank. Such vaporizable liquids would include liquid oxygen, liquid nitrogen, liquid hydrocarbons other than LNG, etc. The invention is also applicable to maintaining pressure in a natural gas-producing field so as to avoid producing excessive vacuum on the wells in the field, or to maintain a given pressure on a gas processing unit. The invention is also advantageous in the transfer of volatile liquids so as to prevent partial vaporization thereof and thus prevent cavitation of the transfer pump.

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

I CLAIM:

1. A method for controlling the pressure of a fluid at a downstream point in a conduit through which said fluid is flowing, so as to maintain the pressure at a spaced apart upstream point in said conduit substantially constant, which method comprises, the steps of:
   a. measuring said pressure in said conduit at said downstream point;
   b. measuring the effective flow rate of said fluid flowing in said conduit past said downstream point; and
   c. adjusting said pressure at said downstream point in accordance with said measured pressure and said measured flow rate, said pressure at said downstream point being decreased when said flow rate increases and being increased when said flow rate decreases.

2. A method in accordance with claim 1 wherein:

said step (a) further comprises establishing a first signal representative of said measured pressure;

said step (b) further comprises establishing a second signal representative of said measured flow rate;

said first signal and said second signal are correlated and there is established a third signal; and in said step (c), said pressure at said downstream point is adjusted responsive to said third signal.

3. A method according to claim 1, employed in the filling of a tank with a vaporizable liquid and during which filling a portion of said liquid vaporizes in said tank to form vapors, and wherein:

said vapors are removed from said tank through said conduit which is connected at its upstream end to said tank; and said pressure at said downstream point is controlled so as to maintain the pressure in said tank substantially constant during the filling thereof.

4. A method according to claim 3 wherein said vaporizable liquid is liquefied natural gas.

5. Apparatus for controlling the pressure of a fluid at a downstream point in a conduit through which said fluid is flowing so as to maintain the pressure at a spaced apart upstream point in said conduit substantially constant, which comprises, in combination:

first means for measuring the pressure at said downstream point;

second means for measuring the effective flow rate of said fluid flowing in said conduit past said downstream point; and third means for adjusting the pressure at said downstream point in response to said measured pressure and said measured flow rate, said pressure at said downstream point being decreased when said flow rate increases and being increased when said flow rate decreases.

6. Apparatus according to claim 5 wherein:

said first means includes a pressure transmitter operatively connected into said conduit at said downstream point and capable of establishing a first signal representative of said measured pressure;

said second means includes a flow rate transmitter operatively connected into said conduit at a point slightly upstream from and adjacent to said pressure transmitter, and capable of establishing a second signal representative of said measured flow rate;

a blower is disposed in said conduit downstream from said downstream point;

said third means includes a pressure controller capable of receiving and correlating said first and second signals and establishing a third signal which is proportional to the pressure drop in said conduit between said upstream point and said downstream point;

said third means also includes a control valve disposed in said conduit downstream from said blower, and operable responsive to said third signal; and a pressure switch operatively connected to the motor of said blower and said pressure controller, and operable to start and stop said motor at the control limits of said pressure controller.

7. Apparatus according to claim 5 wherein:

said first means includes a pressure transmitter operatively connected into said conduit at said downstream point and capable of establishing a first signal representative of said measured pressure;

said second means includes a flow rate transmitter operatively connected into said conduit at a point slightly upstream from and adjacent to said pressure transmitter, and capable of establishing a second signal representative of said measured flow rate;

a blower is disposed in said conduit downstream from said downstream point;

said third means includes a scaling relay capable of receiving said first and second signals, correlating same, and establishing an output signal which is representative of the pressure at said downstream point in said conduit corrected by the pressure drop in said conduit;

said third means also includes a pressure controller capable of receiving said output signal from said relay and establishing a third signal by comparing said output signal with the setpoint of said pressure controller;

said third means also includes a control valve disposed in said conduit downstream from said blower, and operable responsive to said third signal; and a pressure switch operatively connected to the motor of said blower and said pressure controller, and operable to start and stop said motor at the control limits of said pressure controller.

8. Apparatus according to claim 5 wherein:

said first means comprises a pressure measuring means operatively connected into said conduit at said downstream point;

said second means comprises a flow measuring means operatively connected into said conduit at a point upstream from and adjacent said pressure measuring means; and said third means comprises a valve disposed in said conduit downstream from said pressure measuring means.

9. Apparatus according to claim 8 wherein:

said first means further comprises a pressure transmitter capable of establishing a first signal representative of said measured pressure;

said second means further comprises a flow transmitter capable of establishing a second signal representative of said measured flow rate;

a fourth means is provided for correlating said first signal and said second signal and establishing a third signal; and said third means is operatively connected to said fourth means and adjusts said pressure responsive to said third signal.

10. Apparatus according to claim 9 wherein said fourth means comprises a pressure controller capable of correlating said first and second signals and establishing said third signal which is proportional to the pressure drop in said conduit between said upstream point and said downstream point.

11. Apparatus according to claim 9 wherein said fourth means comprises:
means for multiplying said second signal by a constant term to establish a fourth signal;
means for summing said first and fourth signals to establish a fifth signal; and
pressure controller means for receiving said fifth signal and establishing said third signal by comparing said fifth signal with the setpoint of said pressure controller.

* * * * *